(12) United States Patent
Lee et al.

US012438914B2

(10) Patent No.: US 12,438,914 B2
(45) Date of Patent: Oct. 7, 2025

(54) DISAGGREGATED UE ARCHITECTURE

(71) Applicant: QUALCOMM Incorporated, San Diego, CA (US)

(72) Inventors: Soo Bum Lee, San Diego, CA (US); Gavin Bernard Horn, La Jolla, CA (US); Karthika Paladugu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 816 days.

(21) Appl. No.: 17/643,986

(22) Filed: Dec. 13, 2021

(65) Prior Publication Data
US 2023/0188567 A1    Jun. 15, 2023

(51) Int. Cl.
| H04L 9/40 | (2022.01) |
| H04L 69/321 | (2022.01) |
| H04W 12/041 | (2021.01) |
| H04W 12/47 | (2021.01) |
| H04W 12/65 | (2021.01) |
| H04W 76/14 | (2018.01) |
| H04W 76/15 | (2018.01) |

(52) U.S. Cl.
CPC .............. *H04L 63/18* (2013.01); *H04L 63/16* (2013.01); *H04L 63/20* (2013.01); *H04L 69/321* (2013.01); *H04W 12/041* (2021.01); *H04W 12/47* (2021.01); *H04W 12/65* (2021.01); *H04W 76/14* (2018.02); *H04W 76/15* (2018.02)

(58) Field of Classification Search
CPC ......... H04L 63/18; H04L 63/16; H04L 63/20; H04L 69/321; H04W 12/041; H04W 12/47; H04W 12/65; H04W 76/14; H04W 76/15; H04W 12/04; H04W 88/04; H04W 8/005; H04W 12/50
See application file for complete search history.

(56) References Cited

U.S. PATENT DOCUMENTS

| 9,762,444 | B1 * | 9/2017 | Kim ................... H04L 63/0823 |
| 2015/0023336 | A1 | 1/2015 | Ilsar et al. |
| 2015/0229475 | A1 * | 8/2015 | Benoit ................ H04W 12/069 |
| | | | 713/168 |
| 2018/0109418 | A1 * | 4/2018 | Cammarota .......... H04W 12/50 |
| 2021/0352767 | A1 | 11/2021 | Paladugu et al. |
| 2022/0303820 | A1 * | 9/2022 | Xu .................... H04W 28/0268 |

FOREIGN PATENT DOCUMENTS

| CN | 110944406 A | 3/2020 |
| WO | 2022216399 A1 | 10/2022 |

OTHER PUBLICATIONS

International Search Report and Written Opinion—PCT/US2022/049713—ISA/EPO—Mar. 9, 2023.

* cited by examiner

*Primary Examiner* — Marisol Figueroa
(74) *Attorney, Agent, or Firm* — Procopio, Cory, Hargreaves & Savitch

(57) ABSTRACT

Apparatus, methods, and computer program products for disaggregated UE are provided. An example method includes establishing, with a second UE, a connection session based on a configuration profile, the configuration profile including a mapping of an upper-layer protocol to a lower-layer protocol, one or more security policies, and a routing for one or more services associated with the second UE to a protocol stack. The example method further includes managing a connection between the second UE and a third device via the connection session.

30 Claims, 15 Drawing Sheets

DISAGGREGATED UE ARCHITECTURE

TECHNICAL FIELD

The present disclosure relates generally to communication systems, and more particularly, to wireless communication systems with a disaggregated user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a first UE are provided. The apparatus may include a memory and at least one processor coupled to the memory. The memory and the at least one processor coupled to the memory may be configured to establish, with a second UE, a connection session based on a configuration profile, the configuration profile including a mapping of an upper-layer protocol to a lower-layer protocol, one or more security policies, and a routing for one or more services associated with the second UE to a protocol stack. The memory and the at least one processor coupled to the memory may be further configured to manage a connection between the second UE and a third device via the connection session.

In an aspect of the disclosure, a method, a computer-readable medium, and an apparatus at a second UE are provided. The apparatus may include a memory and at least one processor coupled to the memory. The memory and the at least one processor coupled to the memory may be configured to establish, with a first UE, a connection session based on a configuration profile, the configuration profile including a mapping of an upper-layer protocol to a lower-layer protocol, one or more security policies, and a routing for one or more services associated with the second UE to a protocol stack. The memory and the at least one processor coupled to the memory may be further configured to configure a connection between the second UE and third device to be managed by the first UE via the connection session.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
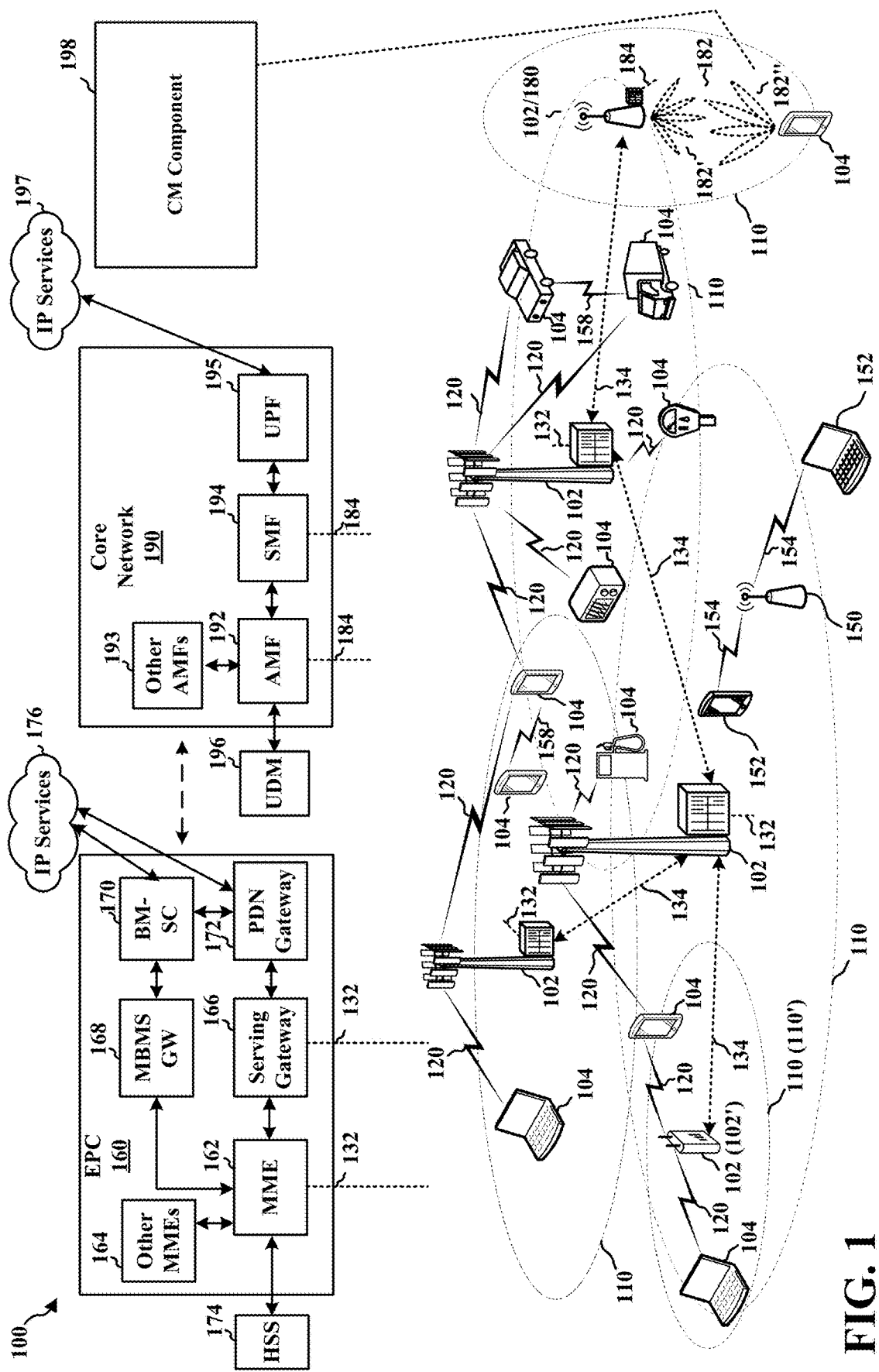
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a configuration management (CM) component 198. In some aspects, the CM component 198 may be configured to establish, with a second UE, a connection session based on a configuration profile, the configuration profile including a mapping of an upper-layer protocol to a lower-layer protocol, one or more security policies, and a routing for one or more services associated with the second UE to a protocol stack. In some aspects, the CM component 198 may be further configured to manage a connection between the second UE and a third device via the connection session. In some aspects, the CM component 198 may be further configured to establish, with a first UE, a connection session based on a configuration profile, the configuration profile including a mapping of an upper-layer protocol to a lower-layer protocol, one or more security policies, and a routing for one or more services associated with the second UE to a protocol stack. In some aspects, the CM component 198 may be further configured to configure a connection between the second UE and a third device to be managed by the first UE via the connection session.

Although the following description may be focused on 5G NR, the concepts described herein may be applicable to other similar areas, such as LTE, LTE-A, CDMA, GSM, and other wireless technologies.

Figure 2:
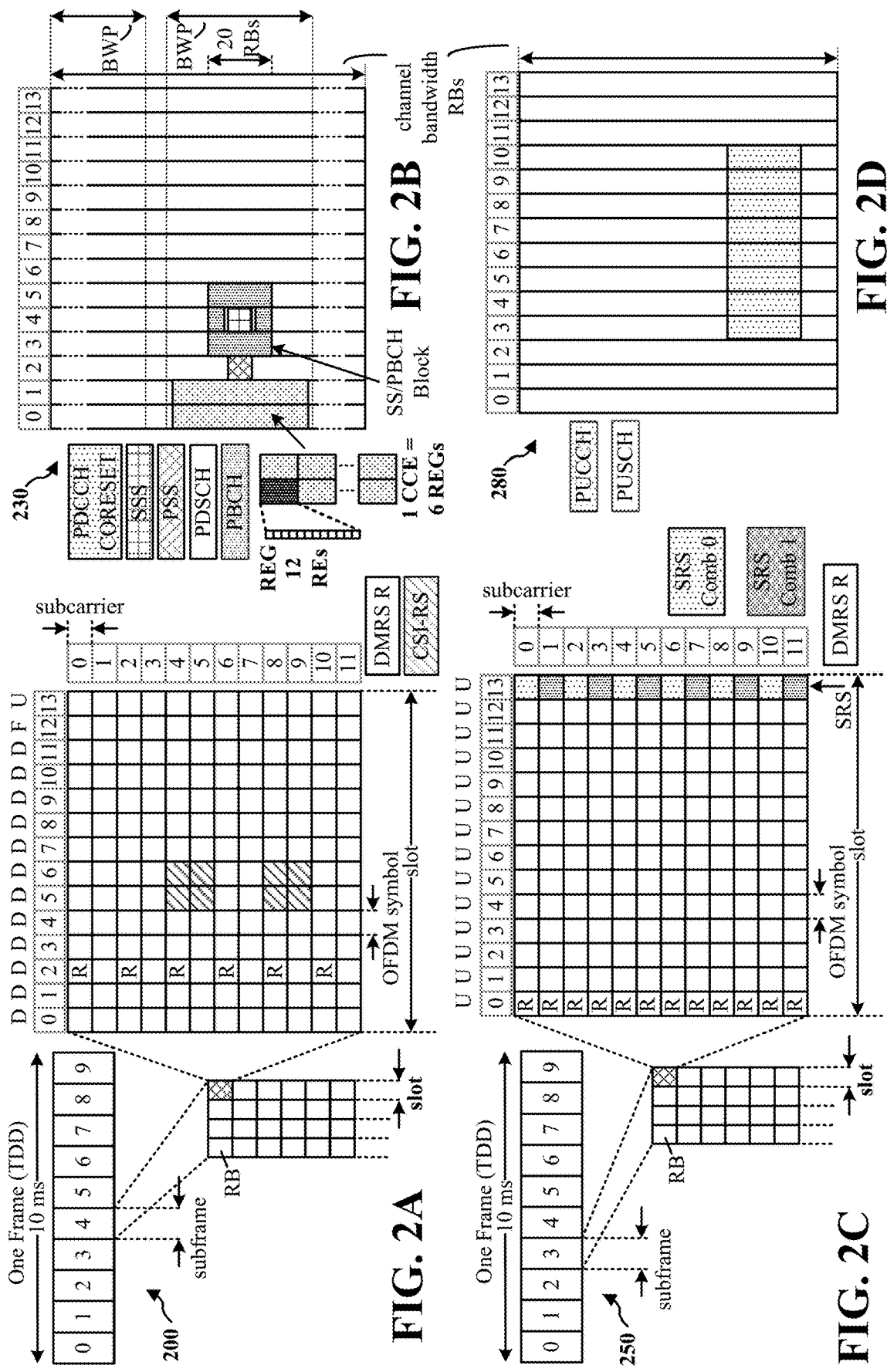
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
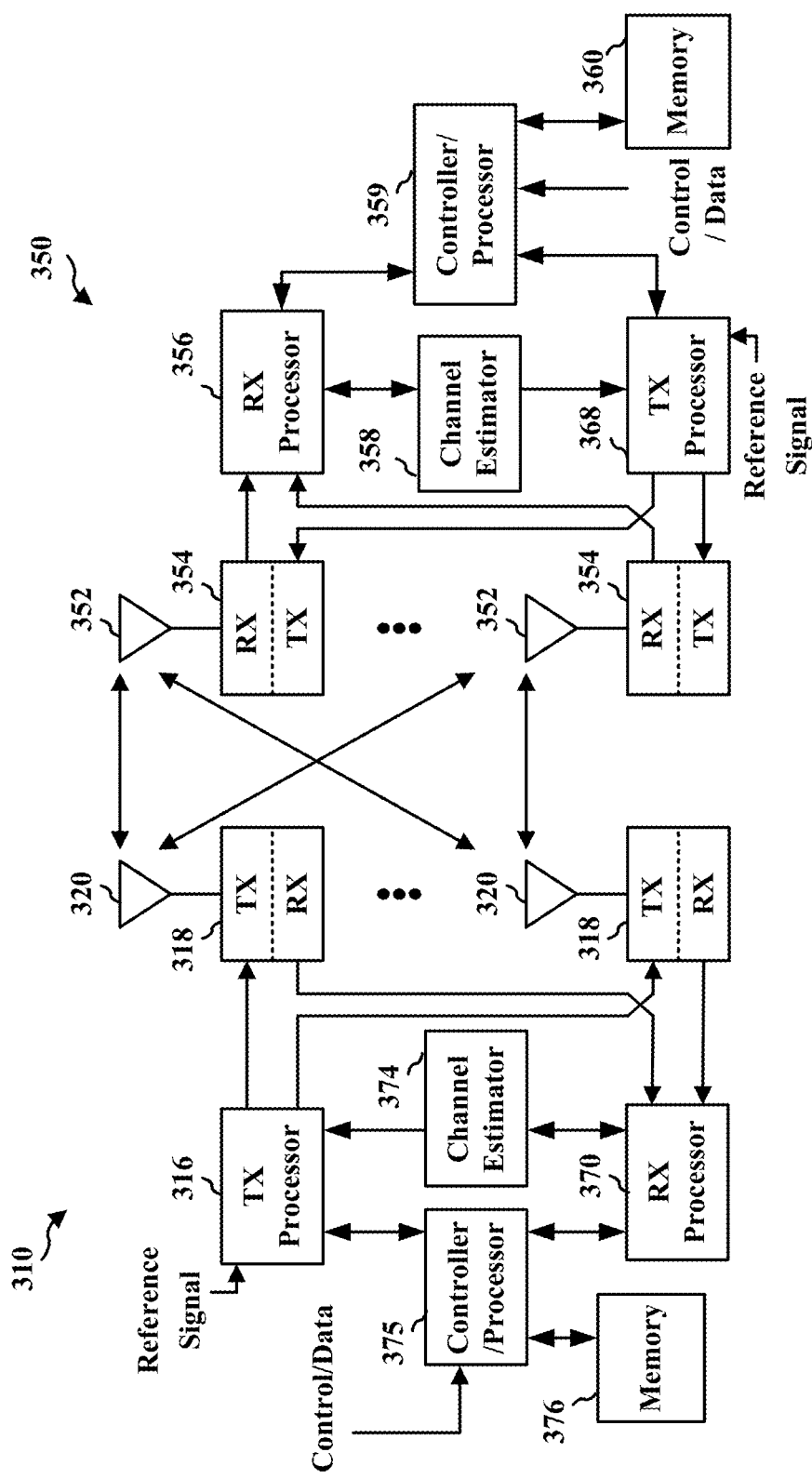
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with CM component 198 of FIG. 1.

Figure 4:
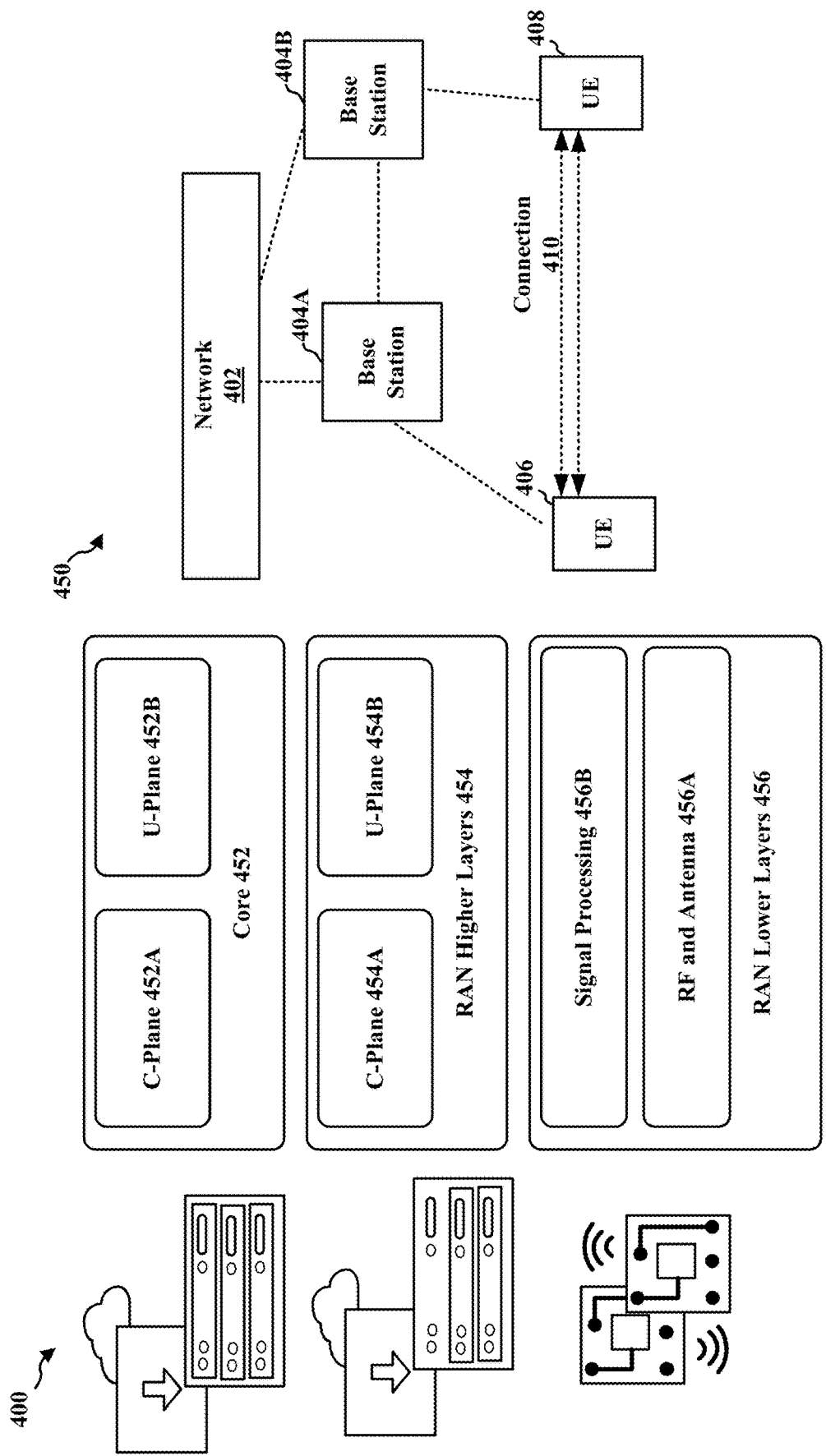
FIG. 4A is a diagram illustrating example disaggregation.
FIG. 4B is a diagram illustrating example communication system.

FIG. 4A is a diagram 400 illustrating example disaggregation. As illustrated in FIG. 4A, in a wireless communication system, core network 452 may be split into C-Plane 452A and U-Plane 452B. Radio access network (RAN) higher layers 454 may also be split into C-Plane 454A and U-Plane 454B. RAN lower layers 456 may include RF and antenna 456A and signal processing 456B. Disaggregation may allow for the support of different deployment scenarios. For example, disaggregation at a RAN may enable flexibility to place processing. Moreover, components of the RAN may be upgraded, customized, or specialized separately, which may allow more flexibility.

Aspects presented herein enable a wireless device to establish a connection, such as a second connection, with a second wireless device to relay communication between the second wireless device and the network entity. Such relay may enable a better link throughput and reliability for UEs. In examples described herein, one device may be described as a "relay UE" and the other device may be referred to as a "remote UE." The relay UE and the remote UE may be collectively referred to as a "disaggregated UE." The term "UE" as used herein may generally refer to non-base station or non-core network wireless devices in a network. A watch UE may be connected to a phone UE and may connect to the network via the phone UE. In such a case, the phone UE may be the relay UE and the watch UE may be the remote UE. A bootstrapping procedure may be a procedure for facilitating a connection between the UEs to enable the remote UE to connect to the network via the relay UE. As part of the bootstrapping procedure, a discovery procedure may be present to share credentials to establish the connection between the UEs. Bootstrapping code may be code shared between the remote UE and the relay UE to enable the discovery procedure.

FIG. 4B is a diagram 450 illustrating example communication system. As illustrated in FIG. 4B, the wireless communication network 402 (which may be a central unit (CU)) may be connected with one or more base stations 404A and 404B (which may be distributed units (DUs)). In some examples, the base stations 404A and 404B may be connected with UEs 406 and 408 via different connections. In some aspects, the base stations 404A and 404B may be connected with one of UE 406 and UE 408, and one of UE 406 or 408 may be used as a relay UE and may manage connections with the RAN for the other one of the UE 406 or 408 via the connection 410. The connection 410 may be a non-Uu connection such as a sidelink connection, a Bluetooth, a Wi-Fi connection, or the like.

Figure 5:
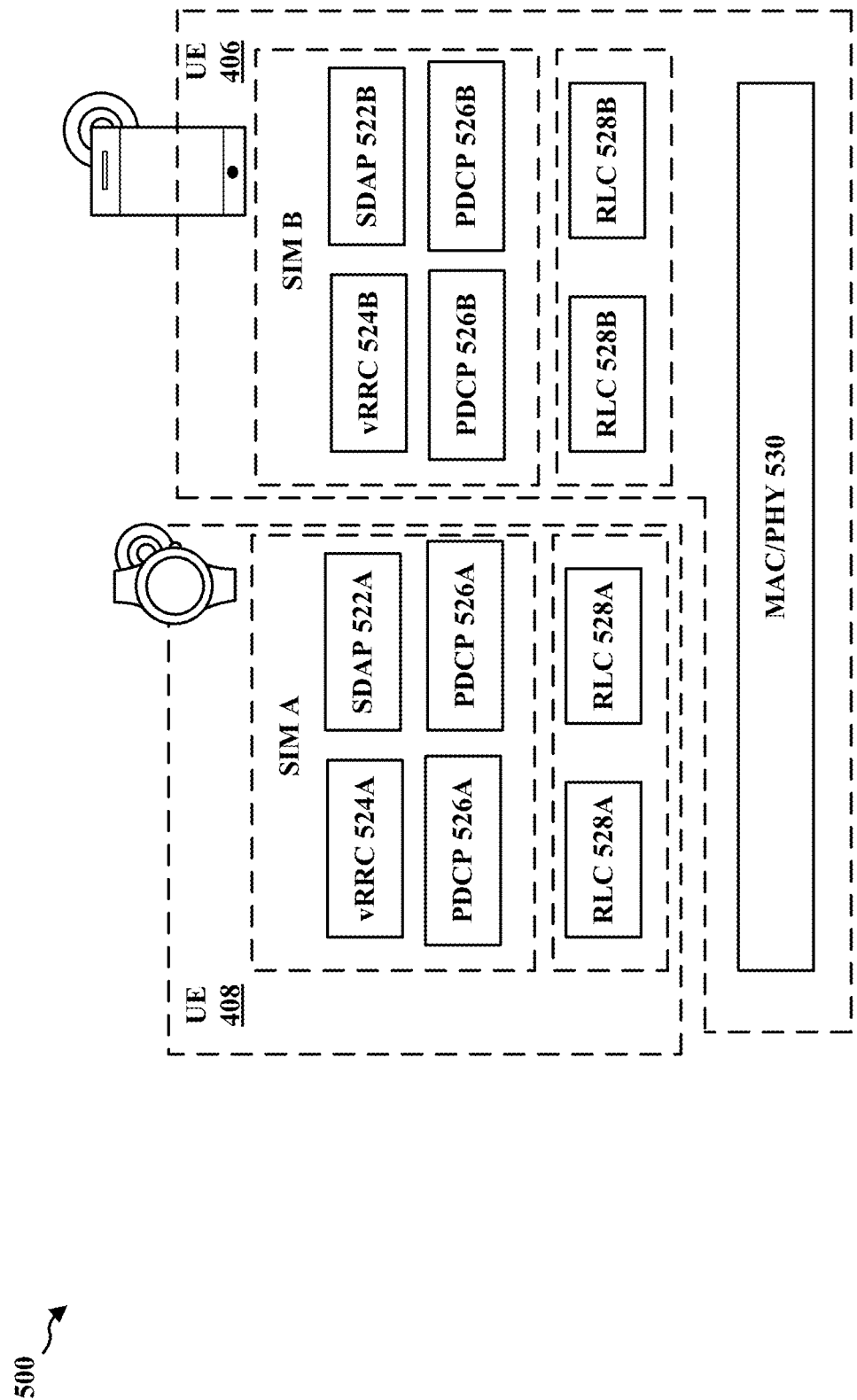
FIG. 5 is a diagram illustrating example disaggregate layers of remote UE and relay UE.

FIG. 5 is a diagram 500 illustrating example disaggregate layers of remote UE and relay UE. As illustrated in diagram 500 in FIG. 5, the UE 408 (which may be the remote UE) may include a first subscriber identity modules SIM (SIM A) that may be associated with RRC 524A (e.g., which may be virtual), SDAP 522A, and PDCP 526A. The UE 408 may further include RLC 528A. The UE 406 may include a second SIM (SIM B) that may be associated with RRC 524B (e.g., which may be virtual), SDAP 522B, and PDCP 526B. The UE 408 may further include RLC 528B. The UE 406 and the UE 408 may be associated with a same MAC/PHY 530, such as the MAC/PHY on the UE 406. In some aspects, the relay UE 406 may act as a coverage extension on behalf of the UE 408 (i.e., a remote UE). For example, the relay UE 406 may relay on behalf of UE 408 (with wide area network (WAN) subscription). The UE 408 may or may not have WAN coverage and may or may not have WAN capabilities. In some aspects, the SIM of the UE 406 may not be used to support data and the UE 408 may share information regarding SIM A with the UE 406. The UE 406 may host the SIM A.

Figures 6A, 6B:
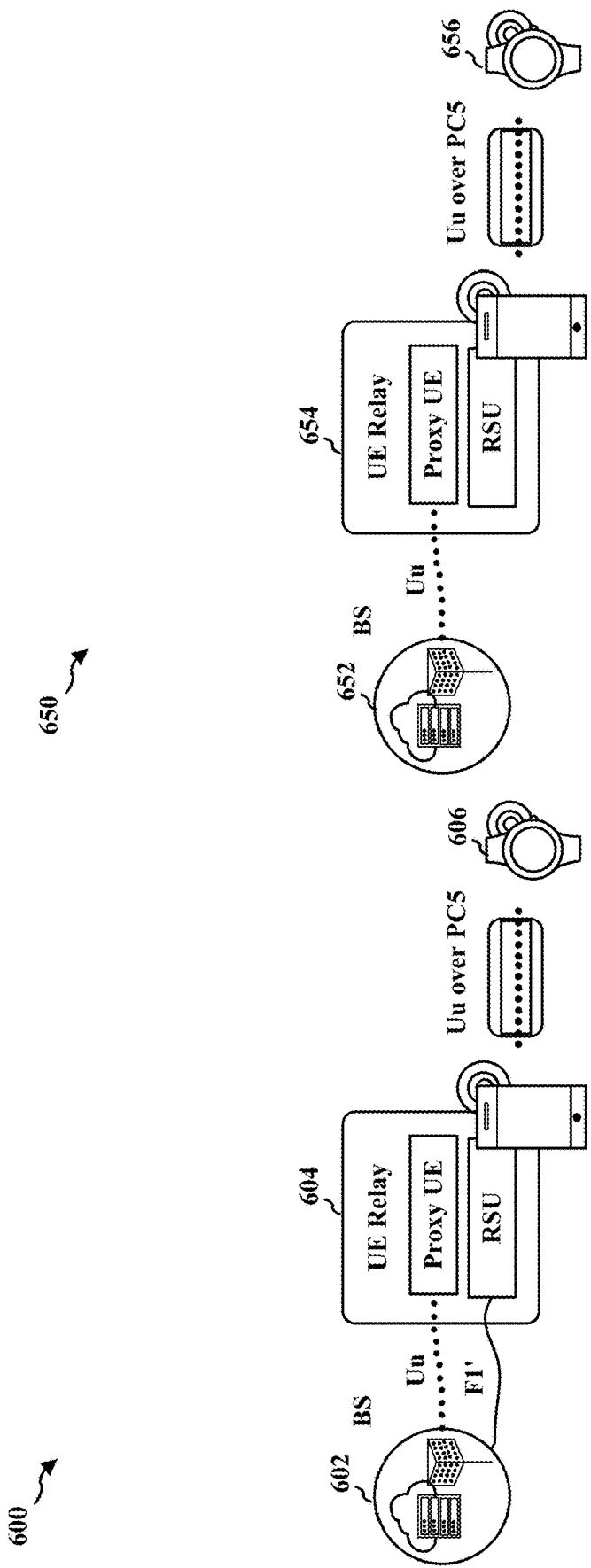
FIGS. 6A and 6B are diagrams illustrating example communication systems with a UE as relay.

FIGS. 6A and 6B are diagrams 600 and 650 illustrating example communication systems with a UE as a relay. As illustrated in diagram 600 of FIG. 6A, integrated UE may be used as a relay. A remote UE 606 may connect to a relay UE 604 via a connection (e.g., sidelink connection, Bluetooth connection, Wi-Fi connection, or other direction connection methods) and the relay UE 604 may connect to the base station 602 via a communication link, such as a UE-UTRAN (Uu) link. The Uu link may also manage the remote UE 606's data connection. An F1 interface between a DU and a CU associated with the base station 602 may also support a Uu link over the sidelink connection or other radio access technologies (RATs) to control the communication between the base station 602 and the remote UE 606. An F1 interface may be hosted at the relay UE 604 to support connection between the base station 602 and the remote UE 606. As illustrated in diagram 650 of FIG. 6B, a proxy UE may be used as a relay. A remote UE 656 may connect to a relay UE 654 via a connection and the relay UE 654 may connect to the base station 652 via a communication link, such as a Uu link. The Uu link may also manage the remote UE 656's data connection. No F1 interface may be hosted at the relay UE 654. The remote UE 656 may support access stratum (AS) connections or non-access stratum (NAS) connections over sidelink or other RATs. The remote UE 656 may support a handover procedure.

Figure 7:
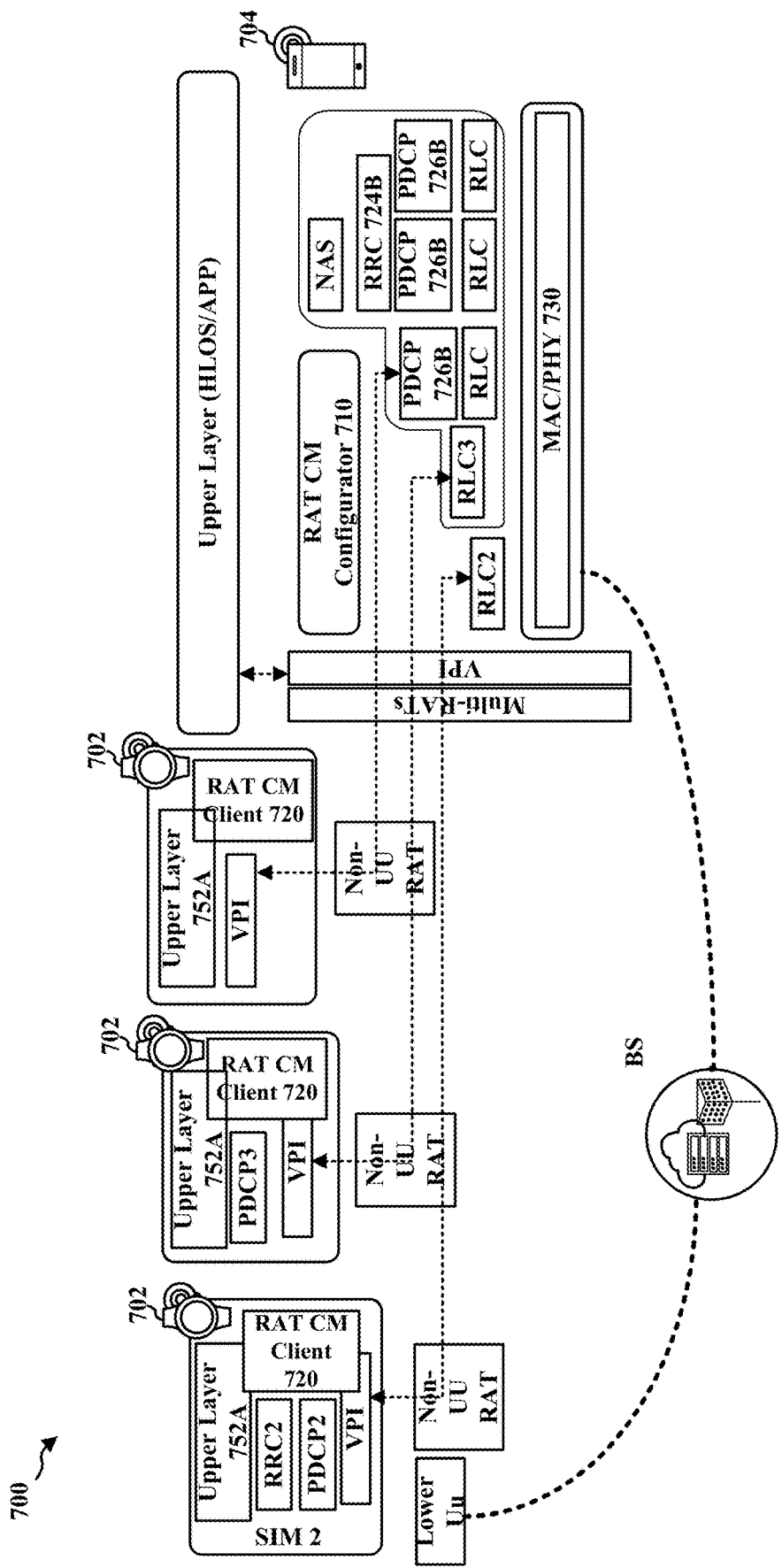
FIG. 7 is a diagram illustrating an example disaggregated UE.

FIG. 7 is a diagram 700 illustrating example disaggregated UE. As illustrated in diagram 700 of FIG. 7, a relay UE 704 may be connected to one or more remote UEs 702. The one or more remote UEs 702 may each include a RAT configuration manager (CM) client 720 and may include associated SIMs. The one or more remote UEs 702 may include upper layer 752A, PDCP, RRC, and one or more virtual protocol interface (VPI)s. The VPI may be configured to route traffic to the configured protocol instances. The VPI may abstract a lower layer protocol layer to the upper layer protocol instance, whereby the upper layer protocol instance processes and forwards the downlink packet (or Protocol Data Unit (PDU)) to the VPI independent of whether the lower layer protocol instance resides in the remote UE or in the relay UE. The VPI may also abstract a lower layer protocol layer to the upper layer protocol instance, whereby the upper layer protocol instance receives and processes the uplink packet (or PDU) from the VPI independent of whether the lower layer protocol instance resides in the remote UE or in the relay UE. The relay UE 604 may include a RAT CM configurator 710 that may be associated with a second SIM (SIM B) that may be associated with RRC 724B, SDAP 722B, and PDCP 726B. In some aspects, the RAT CM configurator 710 may reside on a device separate from the relay UE 604. In some aspects, the RAT CM configurator 710 may reside on the relay UE 604.

The RAT CM configurator 710 and the RAT CM client 720 may be configured to facilitate relay and disaggregation. In some aspects, the RAT CM configurator 710 may be configured to configure devices, such as the one or more remote UEs 702, with a configuration profile (CP). The CP may include an upper-layer protocol to lower-layer protocol mapping, or one or more security policies (credentials, authentication methods, algorithms, and the like) at devices for each service/RAT(s). One service may be mapped to various RATs. The CP may further include routing for each service to protocol stack and a list of trusted devices (e.g., device name, group name) (e.g., associated with the one or more remote UEs 702). The RAT CM client 720 may configure protocol stacks (or protocol instance) between upper-layer (such as an application (App) layer) and a RAT of the remote UEs 702 based on CPs received from RAT CM configurator 710. The RAT CM client 720 may establish connection with one or more peers, such as remote UEs or relay UEs, based on the CP.

In some aspects, the RAT CM configurator 710 may perform RAT configuration and mapping (App-RAT), protocol configuration (such as for Layer 2 protocols), IP configuration for clients, credential provisioning (for peer-to-peer connection), router configuration (for remote to local mapping), or network selection, system information and paging support for the one or more remote UEs 702 with the RAT CM client 720.

The relay UE 704 and the one or more remote UEs 702 may communicate using a non-Uu RAT, such as sidelink communications. A base station may communication with the relay UE 704 or the one or more remote UEs 702 using lower-Uu connections. The relay UE 704 may also include medium access control (MAC)/physical (PHY) layer 730.

To support configuration from a CM configurator to a CM client over sidelink connections (or other non-Uu RAT), a bootstrapping procedure may be used. In general, both a CM configurator and a CM client may discover each other and setup a secure connection to obtain the configuration as part of the bootstrapping procedure. The discovery code used for initial discovery of the CM client and the CM configurator may be referred to as the bootstrapping code. In some aspects, bootstrapping code may be specific to each CM client or common for any CM client. In some aspects, bootstrapping code may be obtained by either device from the other device using the out-of-band (OOB) means (such as quick response (QR) code, near field communication (NFC), or the like) or in-band means (network provisioning).

Figure 8:
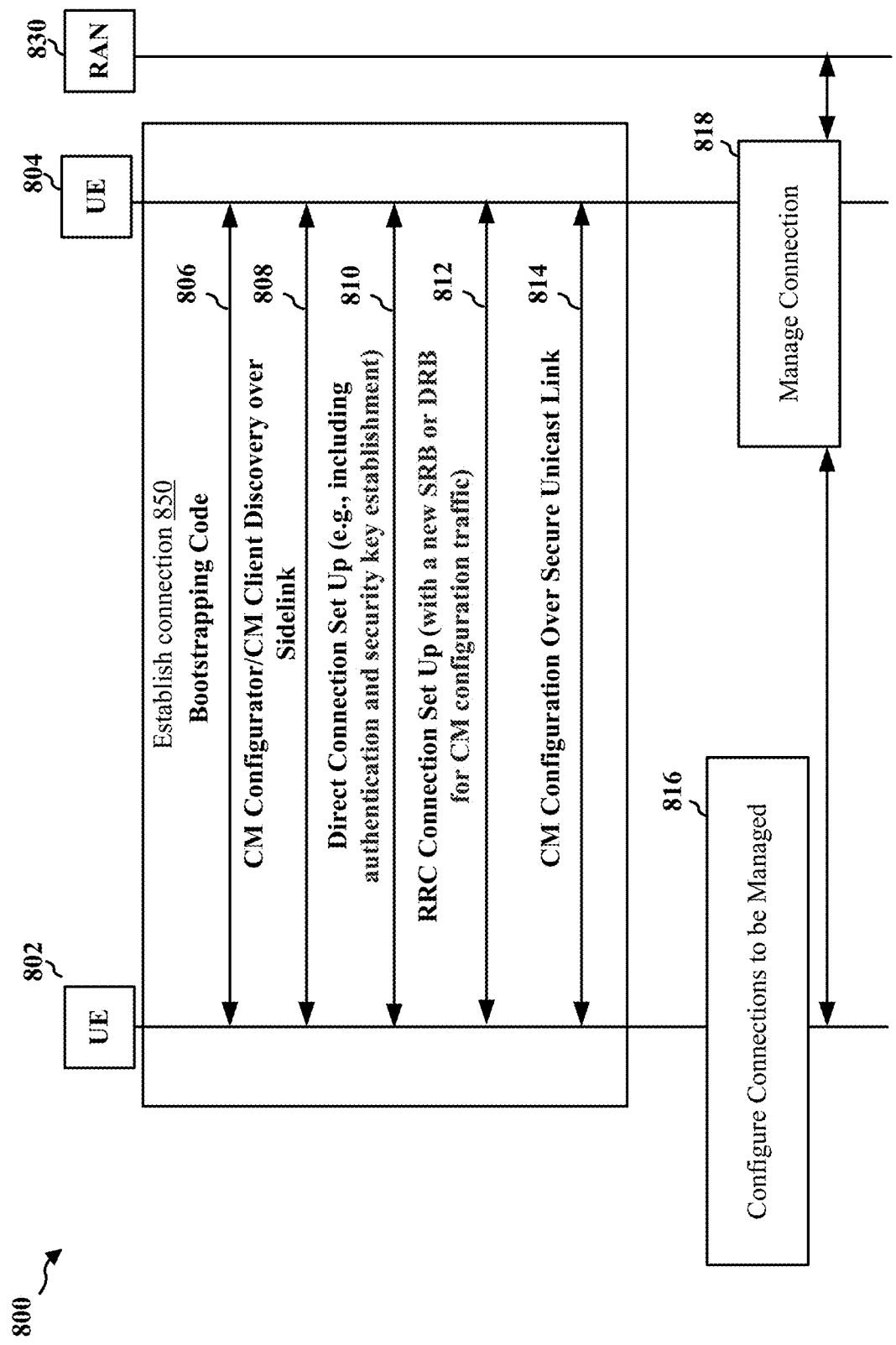
FIG. 8 is a diagram illustrating example communications between UEs and a radio access network (RAN).

FIG. 8 is a diagram 800 illustrating example communications between relay UE 804, remote UE 802, and a RAN 830 for relaying communications. As illustrated in FIG. 8, to establish connection 850, the relay UE 804 and the remote UE 802 may exchange bootstrapping code 806. In some aspects, the bootstrapping code 806 may be exchanged OOB such as via QR code, NFC, or the like. In some aspects, the bootstrapping code 806 may be exchanged in-band via a network.

After exchanging the bootstrapping code 806, a CM configurator on the relay UE 804 and a CM client on the remote UE 802 may be able to discover each other over sidelink or other non-Uu RATs at 808. As part of the discovery at 808, the remote UE 802 and the relay UE 804 may exchange security credentials with each other. The security credentials may include CM client identity information, CM configurator identity information, or the like. In some aspects, the security credentials may be derived based on CM client identity information, CM configurator identity information, bootstrapping code, or the like. The remote UE 802 and the relay UE 804 may authenticate or verify the identity of each other based on the exchanged security credentials in the discovery at 808.

After exchanging the security credentials in the discovery at 808, in some aspects, at 810, the remote UE 802 and the relay UE 804 may set up a direct connection with each other. As part of setting up a direct connection with each other, the remote UE 802 and the relay UE 804 may authenticate or verify the identity of each other based on the exchanged security credentials in the discovery at 808. In some aspects, alternatively or additionally, the remote UE 802 and the relay UE 804 may set up an RRC connection with each other at 812. The RRC connection may be set up using existing or new sidelink radio bearers (SRBs) or data radio bearers (DRBs) using sidelink messages or sidelink RRC messages (e.g., PC5-S or PC5-RRC messages). After setting up the direct connection at 810 or the RRC connection at 812, the remote UE 802 and the relay UE 804 may exchange CM configurations with each other at 814. The direct connection or the RRC connection may facilitate a secure unicast communication link between the remote UE 802 and the relay UE 804. In some aspects, the unicast data traffic over an SL-DRB setup for CM configuration may be configured with a priority higher than other data traffic.

In some aspects, for example, the relay UE 804 may transmit CP to the remote UE 802 so that the remote UE 802 may configure one or more connections to the RAN 830 to be managed by the relay UE 804 at 816. The relay UE 804 may accordingly manage connections for the UE 802 at 818.

Figure 9B:
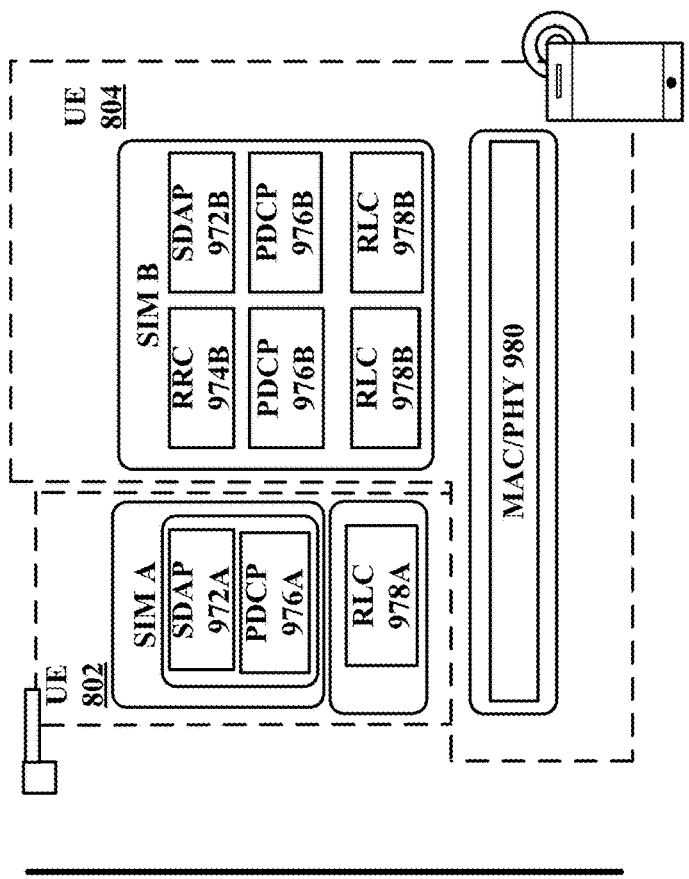
FIGS. 9A-9B are diagrams illustrating example disaggregate layers of a remote UE and a relay UE.
Figure 9A:
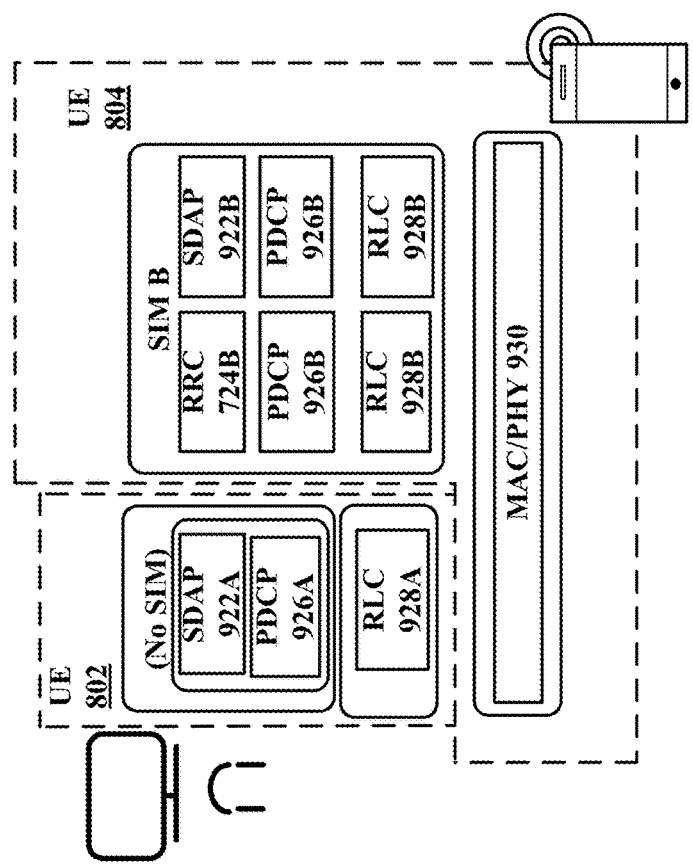

FIGS. 9A-9B are diagrams 900 and 950 illustrating example disaggregate layers of remote UE and relay UE. As illustrated in diagram 900 in FIG. 9A, the UE 802 (which may be the remote UE and may be a separate display or ear buds) may not include a SIM. The UE 802 may include RRC, SDAP 922A, and PDCP 926A. The UE 802 may further include RLC 928A. The UE 804 (which may be the relay UE and may be a vehicle) may include a SIM (SIM B) that may be associated with RRC 924B, SDAP 922B, and PDCP 926B. The UE 1508 may further include RLC 928B. The UE 802 and the UE 804 may be associated with a same MAC/PHY 930, such as the MAC/PHY on the UE 804. In some aspects, the relay UE 804 may act as a coverage extension on behalf of the remote UE 802. In some aspects, via relaying, the relay UE 804 may support end-to-end U-plane at the remote UE 802 even though the remote UE 802 may not have a SIM.

As illustrated in diagram 950 in FIG. 9B, the UE 802 (which may be the remote UE and may be smart glasses or virtual reality, augmented reality, or extended reality devices) may include a SIM (SIM A). The UE 802 may include RRC, SDAP 972A, and PDCP 976A. The UE 802 may further include RLC 978A. The UE 804 (which may be the relay UE and may be a vehicle) may include a SIM (SIM B) that may be associated with RRC 974B, SDAP 972B, and PDCP 976B. The UE 1508 may further include RLC 978B. The UE 802 and the UE 804 may be associated with a same MAC/PHY 980, such as the MAC/PHY on the UE 804. In some aspects, the relay UE 804 may act as a coverage extension on behalf of the remote UE 802. In some aspects, via relaying, the relay UE 804 may support hosting U-plane at the relay UE 802 to enable advanced split rendering or other offload of processing. In such aspects, the SDAP 972B and PDCP 976B of the UE 804 may support (e.g., by processing) SDAP 971A and PDCP 976A of the UE 802.

Figure 10:
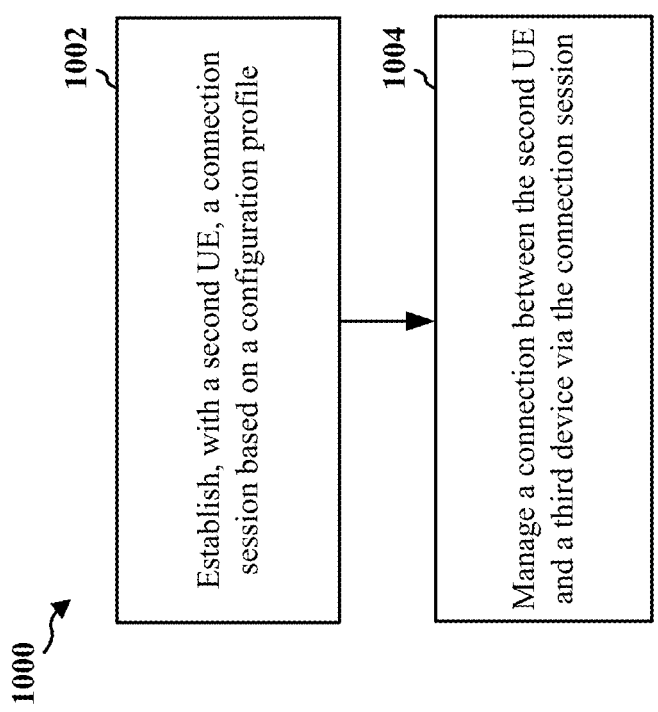
FIG. 10 is a flowchart of a method of wireless communication.

FIG. 10 is a flowchart 1000 of a method of wireless communication. The method may be performed by a first UE (e.g., the UE 104, the UE 704, the UE 804, or other UEs; the apparatus 1402).

At 1002, the UE may establish, with a second UE, a connection session based on a configuration profile. In some aspects, the configuration profile may include a mapping of an upper-layer protocol to a lower-layer protocol, one or more security policies, and a routing for one or more services associated with the second UE to a protocol stack. For example, the UE 804 may establish, with a second UE 802 via a sidelink, a connection session based on a configuration profile at 850. In some aspects, 1002 may be performed by CM component 1442 in FIG. 14. In some aspects, the connection session may be based on sidelink connection, Bluetooth connection, Wi-Fi connection, or other direction connection methods.

At 1004, the UE may manage a connection between the second UE and a third device via the connection session. For example, the UE 804 may manage a connection between the second UE and a third device via the connection session at 818. In some aspects, 1004 may be performed by CM component 1442 in FIG. 14. In some aspects, the third device may be the UE. In some aspects, the third device may be a third UE. In some aspects, the third device may be a RAN.

Figure 11:
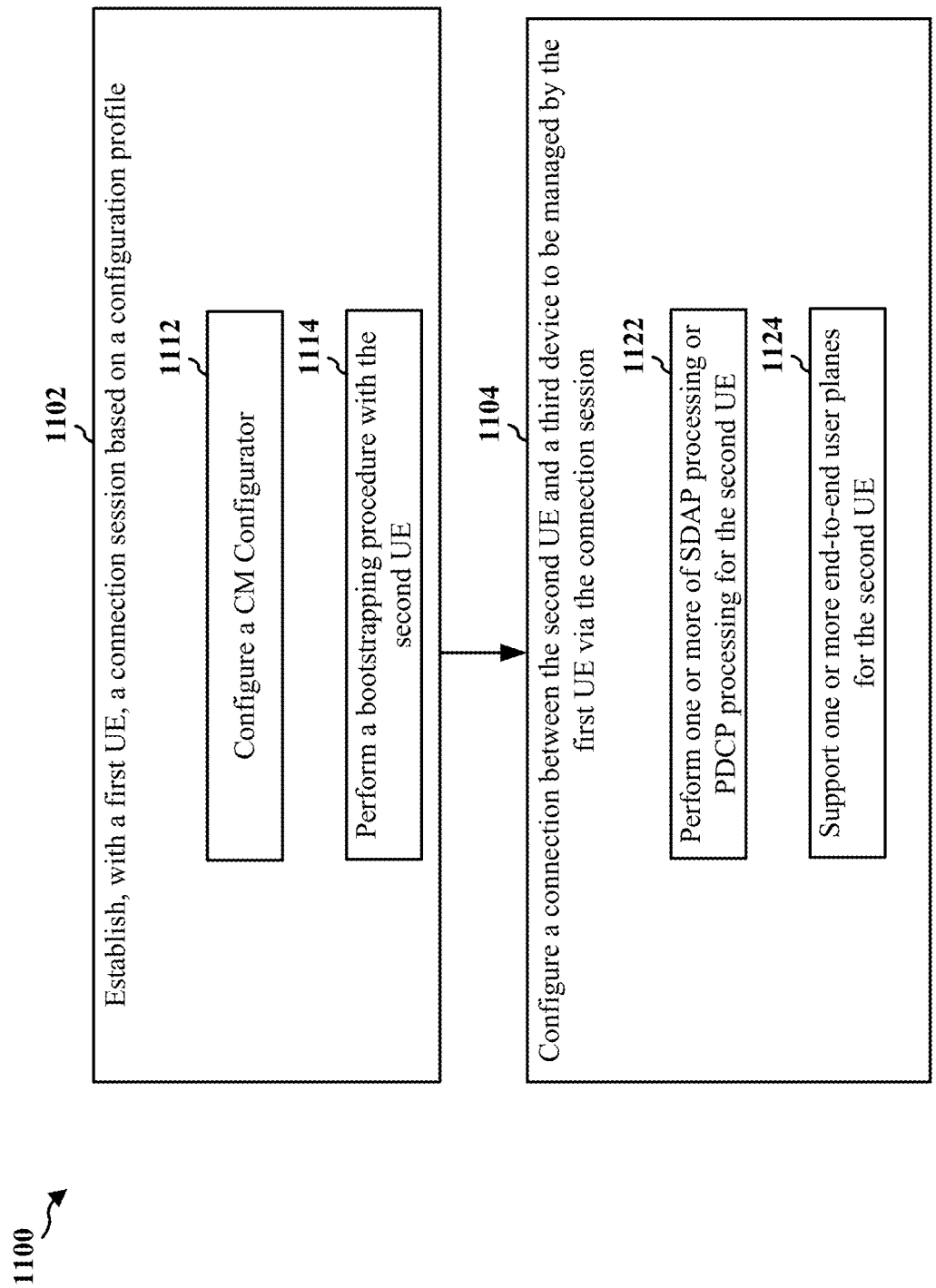
FIG. 11 is a flowchart of a method of wireless communication.

FIG. 11 is a flowchart 1100 of a method of wireless communication. The method may be performed by a first UE (e.g., the UE 104, the UE 704, the UE 804, or other UEs; the apparatus 1402).

At 1102, the UE may establish, with a second UE, a connection session based on a configuration profile. In some aspects, the configuration profile may include a mapping of an upper-layer protocol to a lower-layer protocol, one or more security policies, and a routing for one or more services associated with the second UE to a protocol stack. For example, the UE 804 may establish, with a second UE 802 via a sidelink, a connection session based on a configuration profile at 850. In some aspects, 1102 may be performed by CM component 1442 in FIG. 14. In some aspects, the connection session may be based on sidelink connection, Bluetooth connection, Wi-Fi connection, or other direction connection methods.

In some aspects, the UE may configure a CM configurator at 1112 (e.g., a processor of the UE may perform the role of a CM configurator). For example, the UE 704 may configure a CM configurator 710. The CM configurator may be configured to configure the configuration profile for the second UE, receive, from the second UE, one or more client credentials associated with the second UE, or transmit, to the second UE, one or more owner credentials associated with the first UE. In some aspects, the one or more client credentials may be received out-of-band and associated with one or more of: a QR code including a public key or a certificate, a passcode, or a NFC. In some aspects, the one or more owner credentials may be transmitted in-band or out-of-band. In some aspects, the one or more owner credentials may be transmitted via a device provisioning protocol (e.g., over Wi-Fi).

In some aspects, to establish the connection, the UE may perform a bootstrapping procedure with the second UE at 1114. In some aspects, to perform the bootstrapping procedure with the second UE, the UE may obtain, in-band or out-of-band, a bootstrapping code for discovery of the second UE, discover, via the sidelink, the second UE based on the bootstrapping code, configure a direct connection with the second UE, configure a sidelink RRC connection with the second UE, or establish the connection session with the second UE via a unicast link over the sidelink. In some aspects, to discover the second UE based on the bootstrapping code, the UE may share one or more credentials with the second UE. In some aspects, to configure the direct connection with the second UE, the UE may authenticate and establish a security key. In some aspects, to configure the RRC connection, the UE may configure a SRB or a DRB for the connection session. In some aspects, the bootstrapping code may be unique for the second UE or common for a set of UEs that may include the second UE.

At 1104, the UE may manage a connection between the second UE and a third device via the connection session. For example, the UE 804 may manage a connection between the second UE and a third device via the connection session at 818. In some aspects, the third device may be the UE. In some aspects, the third device may be a third UE. In some aspects, the third device may be a RAN. In some aspects, 1104 may be performed by CM component 1442 in FIG. 14. In some aspects, to manage the connection, at 1122, the UE or the third device may perform one or more of SDAP processing or PDCP processing for the second UE. In some aspects, to manage the connection, at 1124, the UE may support one or more end-to-end user planes for the second UE.

Figure 12:
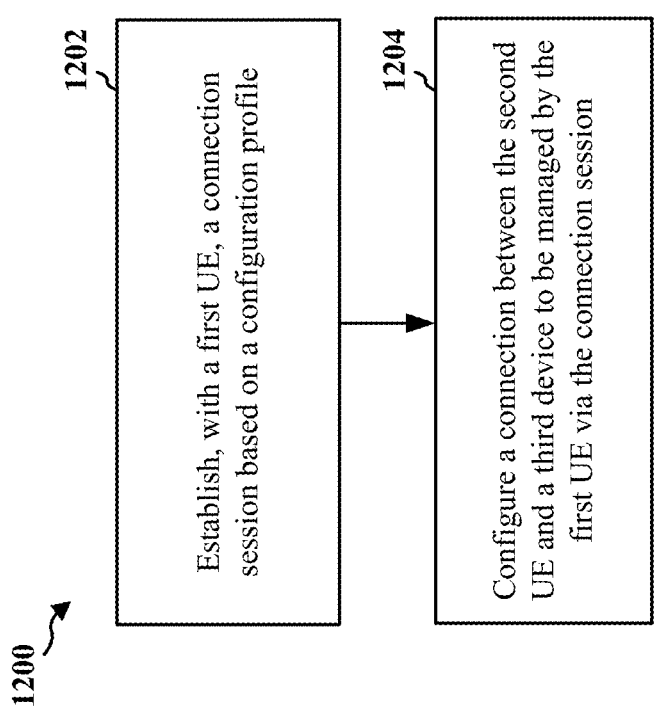
FIG. 12 is a flowchart of a method of wireless communication.

FIG. 12 is a flowchart 1200 of a method of wireless communication. The method may be performed by a second UE (e.g., the UE 104, one of the UEs 702, the UE 802, or other UEs; the apparatus 1402).

At 1202, the UE may establish, with a first UE, a connection session based on a configuration profile. In some aspects, the configuration profile may include a mapping of an upper-layer protocol to a lower-layer protocol, one or more security policies, and a routing for one or more services associated with the first UE to a protocol stack. For example, the UE 802 may establish, with a first UE 804, a connection session based on a configuration profile at 850. In some aspects, 1202 may be performed by CM component 1442 in FIG. 14. In some aspects, the connection session may be based on sidelink connection, Bluetooth connection, Wi-Fi connection, or other direction connection methods.

At 1204, the UE may configure a connection between the second UE and a third device to be managed by the first UE via the connection session. For example, the UE 802 may configure a connection between the second UE 802 and a third device to be managed by the first UE 804 via the connection session at 816. In some aspects, 1204 may be performed by CM component 1442 in FIG. 14. In some aspects, the third device may be the UE. In some aspects, the third device may be a third UE. In some aspects, the third device may be a RAN.

Figure 13:
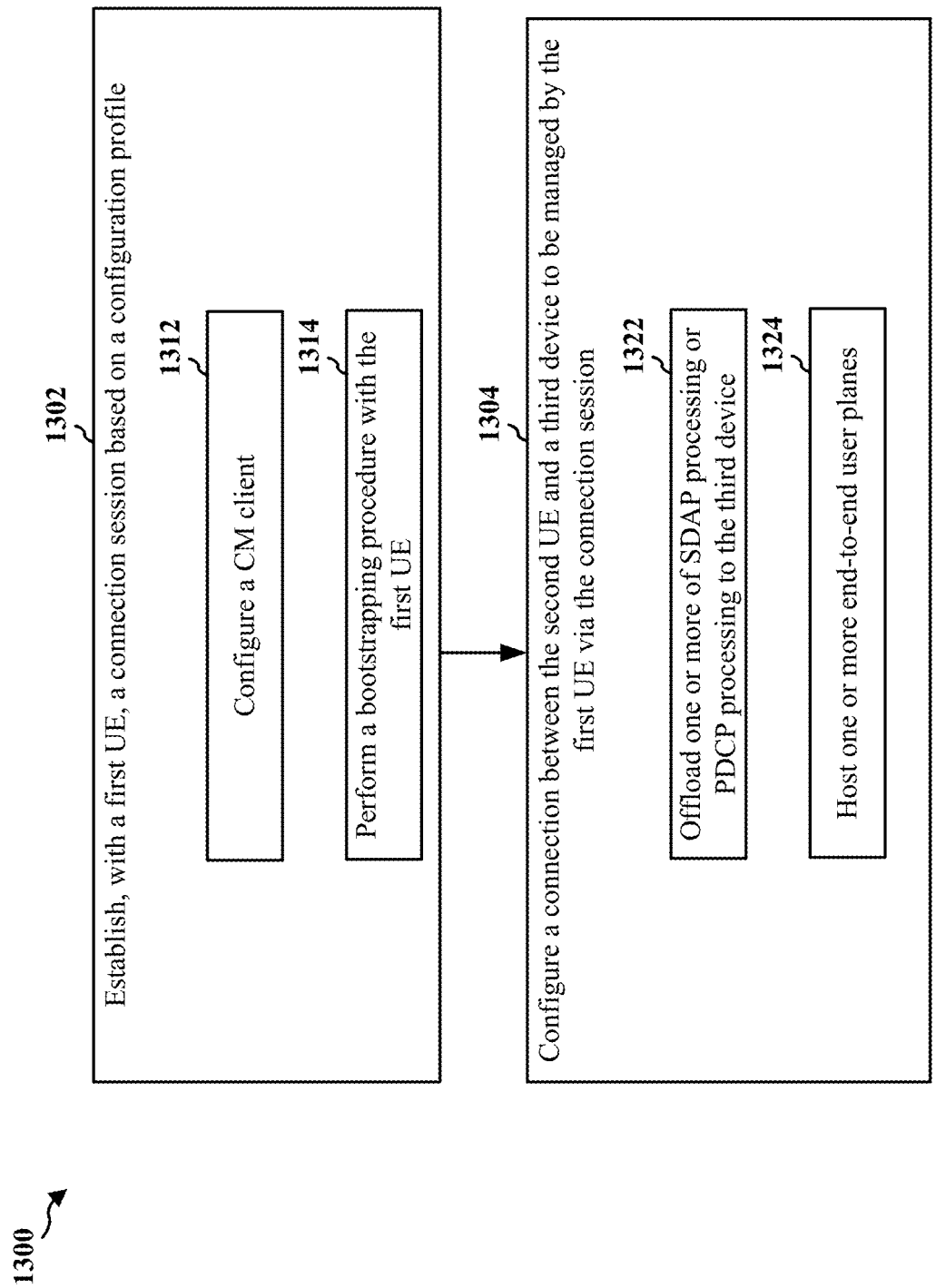
FIG. 13 is a flowchart of a method of wireless communication.

FIG. 13 is a flowchart 1300 of a method of wireless communication. The method may be performed by a first UE (e.g., the UE 104, one of the UEs 702, the UE 802, or other UEs; the apparatus 1402).

At 1302, the UE may establish, with a first UE, a connection session based on a configuration profile. In some aspects, the configuration profile may include a mapping of an upper-layer protocol to a lower-layer protocol, one or more security policies, and a routing for one or more services associated with the first UE to a protocol stack. For example, the UE 802 may establish, with a first UE 804, a connection session based on a configuration profile at 850. In some aspects, 1302 may be performed by CM component 1442 in FIG. 14. In some aspects, the connection session may be based on sidelink connection, Bluetooth connection, Wi-Fi connection, or other direction connection methods.

In some aspects, the UE may configure a CM client at 1312. For example, the UE 704 may configure a CM client 720. The CM client may be configured to receive the configuration profile from the first UE, transmit, to the first UE, one or more client credentials associated with the second UE, or receive, from the first UE, one or more owner credentials associated with the first UE. In some aspects, the one or more client credentials may be transmitted out-of-band and associated with one or more of: a QR code including a public key or a certificate, a passcode, or a NFC. In some aspects, the one or more owner credentials may be received in-band or out-of-band. In some aspects, the one or more owner credentials may be received via a device provisioning protocol (e.g., over Wi-Fi).

In some aspects, to establish the connection, the UE may perform a bootstrapping procedure with the first UE at 1314. In some aspects, to perform the bootstrapping procedure with the first UE, the UE may obtain, in-band or out-of-band, a bootstrapping code for discovery of the first UE, discover, via the sidelink, the first UE based on the bootstrapping code, configure a direct connection with the first UE, configure a sidelink RRC connection with the first UE, or establish the connection session with the first UE via a unicast link over the sidelink. In some aspects, to discover the first UE based on the bootstrapping code, the UE may share one or more credentials with the first UE. In some aspects, to configure the direct connection with the first UE, the UE may authenticate and establish a security key. In some aspects, to configure the RRC connection, the UE may configure a SRB or a DRB for the connection session. In some aspects, the bootstrapping code may be unique for the second UE or common for a set of UEs that may include the second UE.

At 1304, the UE may configure a connection between the second UE and a third device to be managed by the first UE via the connection session. For example, the UE 802 may configure a connection between the second UE 802 and a third device to be managed by the first UE 804 via the connection session at 816. In some aspects, the third device may be the UE. In some aspects, the third device may be a third UE. In some aspects, the third device may be a RAN. In some aspects, 1304 may be performed by CM component 1442 in FIG. 14. In some aspects, to configure the connection, at 1322, the UE may offload one or more of SDAP processing or PDCP processing to the first UE or the third device. In some aspects, to configure the connection, at 1324, the UE may host one or more end-to-end user planes.

Figure 14:
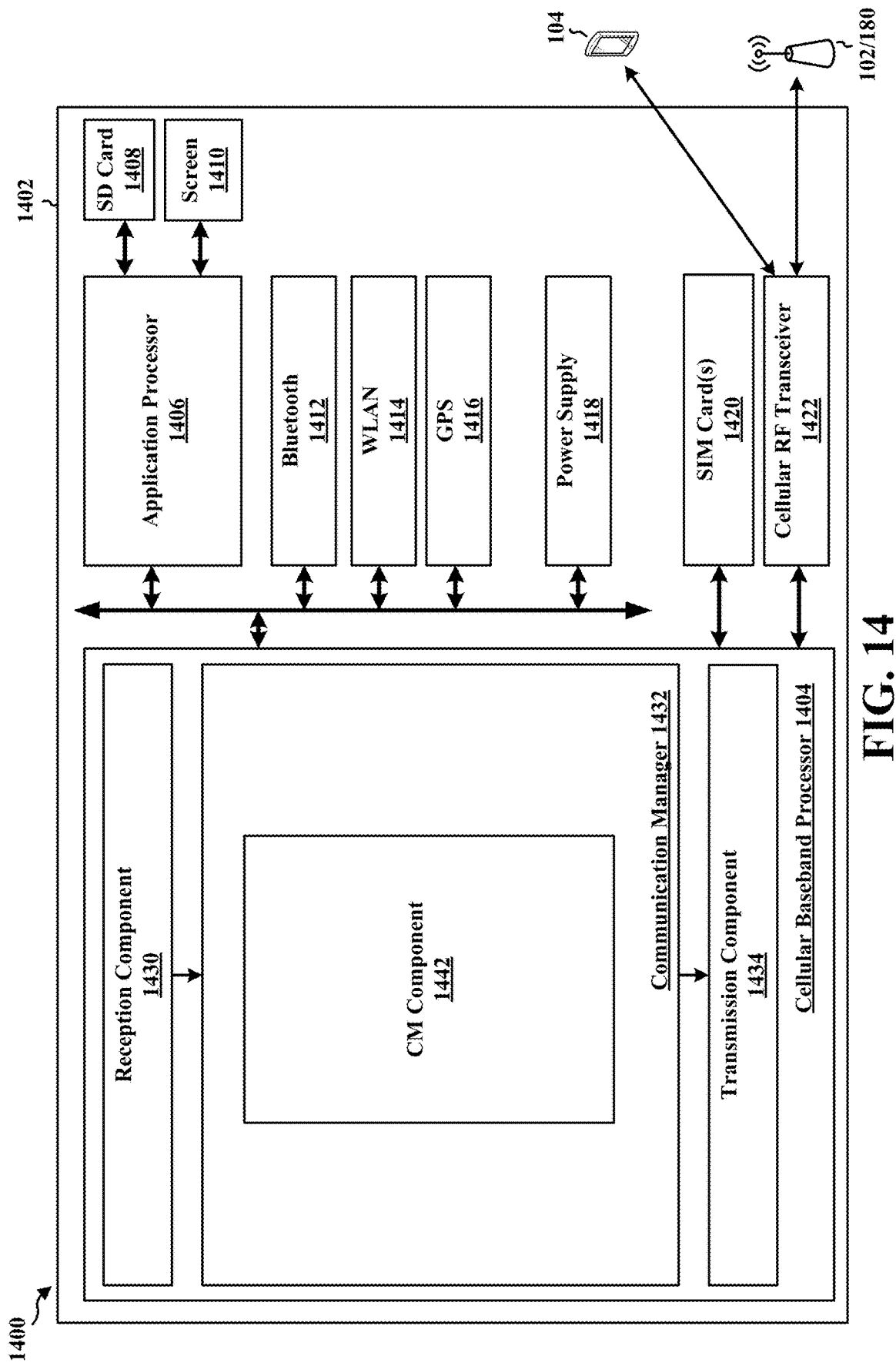
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more SIM cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 may include a CM component 1442 that is configured to establish, with a second UE, a connection session based on a configuration profile, configure a CM configurator, or manage a connection between the second UE and a third device via the connection session, e.g., as described in connection with FIGS. 10-11. The CM configurator may be configured to configure the configuration profile for the second UE, receive, from the second UE, one or more client credentials associated with the second UE, or transmit, to the second UE, one or more owner credentials associated with the first UE. To establish the connection session, the CM component 1442 may perform a bootstrapping procedure with the second UE which may include obtain, in-band or out-of-band, a bootstrapping code for discovery of the second UE, discover, via the sidelink, the second UE based on the bootstrapping code, configure a direct connection with the second UE, configure a sidelink RRC connection with the second UE, or establish the connection session with the second UE via a unicast link over the sidelink. To manage the connection, the CM component 1442 may perform one or more of SDAP processing or PDCP processing for the second UE or support one or more end-to-end user planes for the second UE.

In some aspects, the CM component 1442 may be further configured to establish, with a first UE, a connection session based on a configuration profile, configure a CM client, or configure a connection between the second UE and a third device to be managed by the first UE via the connection session, e.g., as described in connection with FIGS. 12-13. The CM client may be configured to receive the configuration profile from the first UE, transmit, to the first UE, one or more client credentials associated with the second UE, or receive, from the first UE, one or more owner credentials associated with the first UE. To establish the connection, the CM component 1442 may perform a bootstrapping procedure with the first UE which may include obtain, in-band or out-of-band, a bootstrapping code for discovery of the first UE, discover, via the sidelink, the first UE based on the bootstrapping code, configure a direct connection with the first UE, configure a sidelink RRC connection with the first UE, or establish the connection session with the first UE via a unicast link over the sidelink. To configure the connection, the CM component 1442 may offload one or more of SDAP processing or PDCP processing to the third device or host one or more end-to-end user planes.

The apparatus may include additional components that perform each of the blocks of the algorithm in the flowcharts of FIGS. 10-13. As such, each block in the flowcharts of FIGS. 10-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, may include means for establishing, with a second UE, a connection session based on a configuration profile, the configuration profile including a mapping of an upper-layer protocol to a lower-layer protocol, one or more security policies, and a routing for one or more services associated with the second UE to a protocol stack. The cellular baseband processor 1404 may further include means for managing a connection between the second UE and a third device via the connection session. The cellular baseband processor 1404 may further include means for configuring the configuration profile for the second UE. The cellular baseband processor 1404 may further include means for receiving, from the second UE, one or more client credentials associated with the second UE. The cellular baseband processor 1404 may further include means for transmitting, to the second UE, one or more owner credentials associated with the first UE. The cellular baseband processor 1404 may further include means for performing a bootstrapping procedure with the second UE. The cellular baseband processor 1404 may further include means for obtaining, in-band or out-of-band, a bootstrapping code for discovery of the second UE. The cellular baseband processor 1404 may further include means for discovering, via the sidelink, the second UE based on the bootstrapping code. The cellular baseband processor 1404 may further include means for configuring a direct connection with the second UE. The cellular baseband processor 1404 may further include means for configuring a sidelink RRC connection with the second UE. The cellular baseband processor 1404 may further include means for establishing the connection session with the second UE via a unicast link over the sidelink. The cellular baseband processor 1404 may further include means for performing one or more of SDAP processing or PDCP processing for the second UE. The cellular baseband processor 1404 may further include means for supporting one or more end-to-end user planes for the second UE. The cellular baseband processor 1404 may further include means for establishing, with a first UE, a connection session based on a configuration profile, the configuration profile including a mapping of an upper-layer protocol to a lower-layer protocol, one or more security policies, and a routing for one or more services associated with the second UE to a protocol stack. The cellular baseband processor 1404 may further include means for configuring a connection between the second UE and a third device to be managed by the first UE via the connection session. The cellular baseband processor 1404 may further include means for receiving the configuration profile from the first UE. The cellular baseband processor 1404 may further include means for transmitting, to the first UE, one or more client credentials associated with the second UE. The cellular baseband processor 1404 may further include means for receiving, from the first UE, one or more owner credentials associated with the first UE. The cellular baseband processor 1404 may further include means for performing a bootstrapping procedure with the first UE. The cellular baseband processor 1404 may further include means for obtaining, in-band or out-of-band, a bootstrapping code for discovery of the first UE. The cellular baseband processor 1404 may further include means for discovering, via the sidelink, the first UE based on the bootstrapping code. The cellular baseband processor 1404 may further include means for configuring a direct connection with the first UE. The cellular baseband processor 1404 may further include means for configuring a sidelink RRC connection with the first UE. The cellular baseband processor 1404 may further include means for establishing the connection session with the first UE via a unicast link over the sidelink. The cellular baseband processor 1404 may further include means for offloading one or more of SDAP processing or PDCP processing to the third device. The cellular baseband processor 1404 may further include means for hosting one or more end-to-end user planes. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
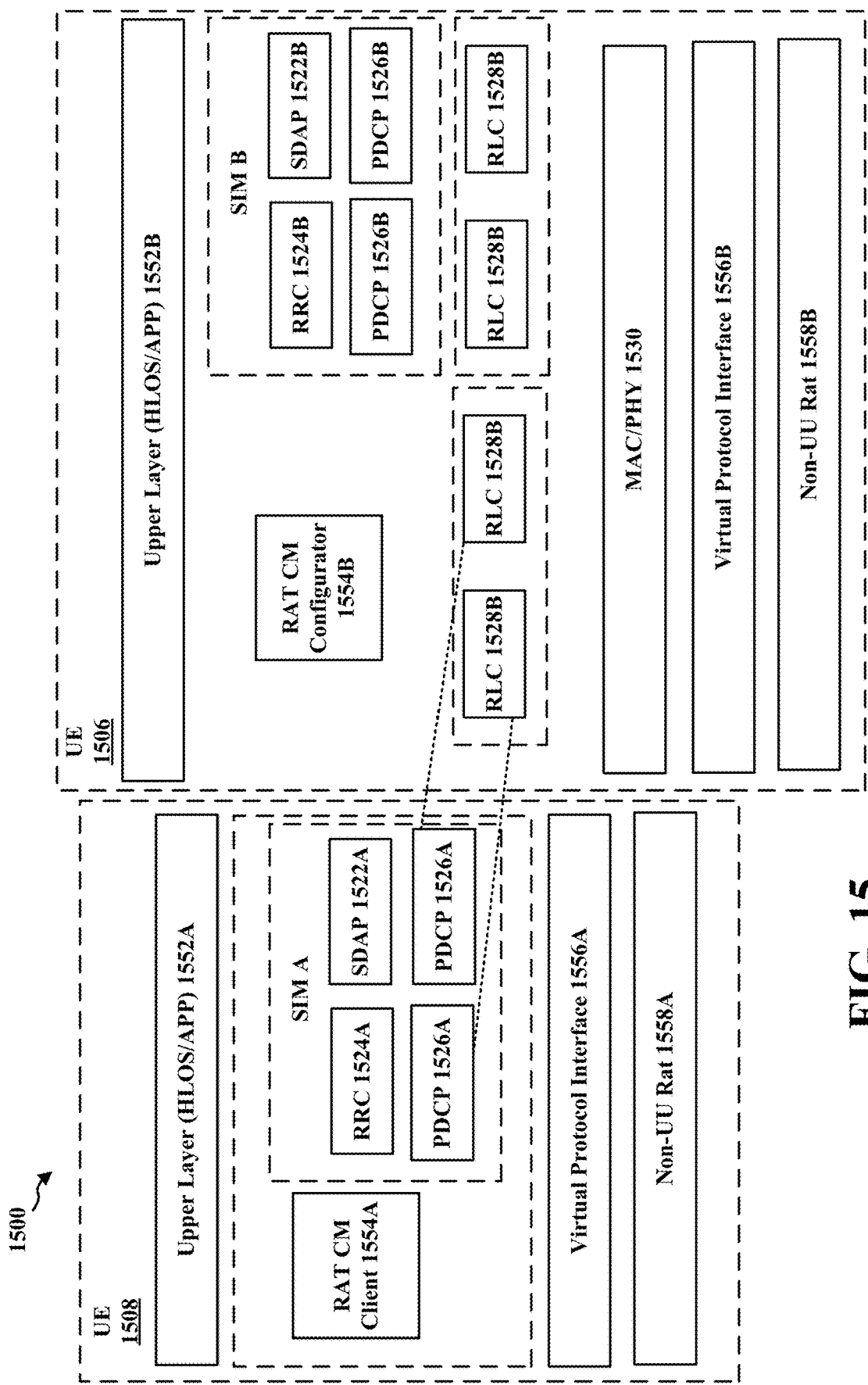
FIG. 15 is a diagram illustrating an example disaggregated UE.

FIG. 15 is an example illustrating inter-device interfaces. As illustrated in example 1500 of FIG. 15, the remote UE 1508 may include an upper layer 1552A that may include APP component. The remote UE 1508 may further include a RAT CM client 1554A and the previously described SIM A and RRC 1524A, SDAP 1522A, and PDCP 1526A. The UE 1508 may further include VPI 1556A and non-UU RAT 1558A. The relay UE 1506 may include an upper layer 1552B that may include APP. The relay UE 1506 may further include a RAT CM configurator 1554B and the previously described SIM B and RRC 1524B, SDAP 1522B, PDCP 1526B, RLC 1528B, and MAC/PHY 1530. The relay UE 1506 may further include VPI 1556B and non-UU RAT 1558B. The VPI 1556A and 1556B may be configured to expose API between protocol stacks and route. The RAT CM manager may be configured to perform or configure RAT configuration and mapping (App to RAT mapping), protocol configuration (L2 protocols), IP configuration for clients (such as the RAT CM client 1554A), credential provisioning (for peer to peer connection), router configuration (for remote to local mapping), network selection, system information and paging support, or the like.

In some aspects, the first credential and the second credential provides the associated radio network access parameters and authorizations, so that the relay UE may be able to select and establish a connection with a wireless network that may serve the remote UE using the second credential. For example, the relay UE may serve on one or more of the cell selection, PLMN selection criteria, and priorities. In some other aspects, the first credential may be derived from the second credential by the remote UE locally and shared with the relay UE. For example, the first credential may be generated by the remote UE signal an indication to the core network within the NAS message, and obtain the corresponding temporary identifier and security context that can be used for a relay operation. For example, a registration request message from the remote UE with an additional indicator that a temporary relay credential may be requested when the remote UE is in coverage. The AMF may then assign a special credential container, e.g., Subscription Concealed Identifier (SUCI) or Global Unique Temporary Identifier (GUTI) and security context, and send that back to the remote UE. The remote UE stores this and shares that with the relay UE via a connection, e.g., sidelink, Bluetooth, Wi-Fi, or the like, when it is about to use the relay to access the network. The AMF may store this to the UDM or UDR, so that when the relay UE uses this allocated SUCI and 5G-GUTI to access the network, the corresponding authorization parameters, e.g., limited to relay, may be retrieved from the UDR or UDM and sent to the RAN. The remote UE may also share other information with the relay UE, e.g., PLMN ID to use, or access categories, etc.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE, comprising: a memory; and at least one processor coupled to the memory and configured to: establish, with a second UE, a connection session based on a configuration profile, the configuration profile including a mapping of an upper-layer protocol to a lower-layer protocol, one or more security policies, and a routing for one or more services associated with the second UE to a protocol stack; and manage a connection between the second UE and a third device via the connection session.

Aspect 2 is the apparatus of aspect 1, wherein the at least one processor is further configured to configure a CM configurator to: configure the configuration profile for the second UE; receive, from the second UE, one or more client credentials associated with the second UE; and transmit, to the second UE, one or more owner credentials associated with the first UE.

Aspect 3 is the apparatus of any of aspects 1-2, wherein the one or more client credentials are received out-of-band and associated with one or more of: a QR code comprising a public key or a certificate, a passcode, or a NFC.

Aspect 4 is the apparatus of any of aspects 1-3, wherein the one or more owner credentials are transmitted in-band or out-of-band.

Aspect 5 is the apparatus of any of aspects 1-4, wherein the one or more owner credentials are transmitted via a device provisioning protocol.

Aspect 6 is the apparatus of any of aspects 1-5, wherein to establish the connection session, the at least one processor is configured to: perform a bootstrapping procedure with the second UE.

Aspect 7 is the apparatus of any of aspects 1-6, wherein to perform the bootstrapping procedure with the second UE, the at least one processor is configured to: obtain, in-band or out-of-band, a bootstrapping code for discovery of the second UE; discover, via a sidelink, the second UE based on the bootstrapping code; configure a direct connection with the second UE; configure a sidelink RRC connection with the second UE; and establish the connection session with the second UE via a unicast link over the sidelink.

Aspect 8 is the apparatus of any of aspects 1-7, wherein to discover the second UE based on the bootstrapping code, the at least one processor is configured to: share one or more credentials with the second UE.

Aspect 9 is the apparatus of any of aspects 1-8, wherein to configure the direct connection with the second UE, the at least one processor is configured to: authenticate and establish a security key.

Aspect 10 is the apparatus of any of aspects 1-9, wherein to configure the RRC connection, the at least one processor is configured to: configure a SRB or a DRB for the connection session.

Aspect 11 is the apparatus of any of aspects 1-10, wherein the bootstrapping code is unique for the second UE or common for a set of UEs including the second UE.

Aspect 12 is the apparatus of any of aspects 1-11, wherein to manage the connection, the at least one processor is configured to: perform one or more of SDAP processing or PDCP processing for the second UE.

Aspect 13 is the apparatus of any of aspects 1-12, wherein to manage the connection, the at least one processor is configured to: support one or more end-to-end user planes for the second UE.

Aspect 14 is the apparatus of any of aspects 1-13, further comprising a transceiver coupled to the at least one processor, wherein the third device is one of: a third UE, the first UE, or a RAN.

Aspect 15 is an apparatus for wireless communication at a second UE, comprising: a memory; and at least one processor coupled to the memory and configured to: establish, with a first UE, a connection session based on a configuration profile, the configuration profile including a mapping of an upper-layer protocol to a lower-layer protocol, one or more security policies, and a routing for one or more services associated with the second UE to a protocol stack; and configure a connection between the second UE and a third device to be managed by the first UE via the connection session.

Aspect 16 is the apparatus of aspect 15, wherein the at least one processor is further configured to configure a CM client to: receive the configuration profile from the first UE;

transmit, to the first UE, one or more client credentials associated with the second UE; and receive, from the first UE, one or more owner credentials associated with the first UE.

Aspect 17 is the apparatus of any of aspects 15-16, wherein the one or more client credentials are transmitted out-of-band and associated with one or more of: a QR code comprising a public key or a certificate, a passcode, or a NFC.

Aspect 18 is the apparatus of any of aspects 15-17, wherein the one or more owner credentials are received in-band or out-of-band.

Aspect 19 is the apparatus of any of aspects 15-18, wherein the one or more owner credentials are received via a device provisioning protocol.

Aspect 20 is the apparatus of any of aspects 15-19, wherein to establish the connection session, the at least one processor is configured to: perform a bootstrapping procedure with the first UE.

Aspect 21 is the apparatus of any of aspects 15-20, wherein to perform the bootstrapping procedure with the first UE, the at least one processor is configured to: obtain, in-band or out-of-band, a bootstrapping code for discovery of the first UE; discover, via a sidelink, the first UE based on the bootstrapping code; configure a direct connection with the first UE; configure a sidelink RRC connection with the first UE; and establish the connection session with the first UE via a unicast link over the sidelink.

Aspect 22 is the apparatus of any of aspects 15-21, wherein to discover the first UE based on the bootstrapping code, the at least one processor is configured to: share one or more credentials with the first UE.

Aspect 23 is the apparatus of any of aspects 15-22, wherein to configure the direct connection with the first UE, the at least one processor is configured to: authenticate and establish a security key.

Aspect 24 is the apparatus of any of aspects 15-23, wherein to configure the RRC connection, the at least one processor is configured to: receive a configuration of a SRB or a DRB for the connection session.

Aspect 25 is the apparatus of any of aspects 15-24, wherein the bootstrapping code is unique for the second UE or common for a set of UEs including the second UE.

Aspect 26 is the apparatus of any of aspects 15-25, wherein to configure the connection, the at least one processor is configured to: offload one or more of SDAP processing or PDCP processing to the first UE.

Aspect 27 is the apparatus of any of aspects 15-26, wherein to manage the connection, the at least one processor is configured to: host one or more end-to-end user planes.

Aspect 28 is the apparatus of any of aspects 15-27, further comprising a transceiver coupled to the at least one processor, wherein the third device is one of: a third UE, the first UE, or a RAN.

Aspect 29 is a method of wireless communication for implementing any of aspects 1 to 14.

Aspect 30 is an apparatus for wireless communication including means for implementing any of aspects 1 to 14.

Aspect 31 is a computer-readable medium storing computer executable code, where the code when executed by a processor causes the processor to implement any of aspects 1 to 14.

Aspect 32 is a method of wireless communication for implementing any of aspects 15 to 28.

Aspect 33 is an apparatus for wireless communication including means for implementing any of aspects 15 to 28.

Aspect 34 is a computer-readable medium storing computer executable code, where the code when executed by a processor causes the processor to implement any of aspects 15 to 28.

What is claimed is:

1. An apparatus for wireless communication at a first user equipment (UE), comprising:
    memory; and
    at least one processor coupled to the memory and configured to:
        establish, with a second UE, a connection session based on a configuration profile, the configuration profile including a mapping of an upper-layer protocol to a lower-layer protocol, one or more security policies, and a routing for one or more services associated with the second UE to a protocol stack, wherein a first radio resource control (RRC) entity at the first UE and a second RRC entity at the second UE are virtual and associated with a same medium access control (MAC) entity and a same physical layer entity; and
        manage a connection between the second UE and a third device via the connection session.

2. The apparatus of claim 1, wherein the at least one processor is further configured to configure a configuration management (CM) configurator to:
    configure the configuration profile for the second UE;
    receive, from the second UE, one or more client credentials associated with the second UE; and
    transmit, to the second UE, one or more owner credentials associated with the first UE.

3. The apparatus of claim 2, wherein to receive the one or more client credentials, the at least one processor is configured to configure the CM configurator to receive the one or more client credentials out-of-band, wherein the one or more client credentials are associated with one or more of: a Quick Response (QR) code comprising a public key or a certificate, a passcode, or a near field communication (NFC).

4. The apparatus of claim 2, wherein to transmit the one or more owner credentials, the at least one processor is configured to configure the CM configurator to transmit the one or more owner credentials in-band or out-of-band.

5. The apparatus of claim 2, wherein to transmit the one or more owner credentials, the at least one processor is configured to configure the CM configurator to transmit the one or more owner credentials via a device provisioning protocol.

6. The apparatus of claim 1, wherein to establish the connection session, the at least one processor is configured to:
    perform a bootstrapping procedure with the second UE.

7. The apparatus of claim 6, wherein to perform the bootstrapping procedure with the second UE, the at least one processor is configured to:
    obtain, in-band or out-of-band, a bootstrapping code for discovery of the second UE;
    discover, via a sidelink, the second UE based on the bootstrapping code;
    configure a direct connection with the second UE;
    configure a sidelink RRC connection with the second UE; and
    establish the connection session with the second UE via a unicast link over the sidelink.

8. The apparatus of claim 7, wherein to discover the second UE based on the bootstrapping code, the at least one processor is configured to: share one or more credentials with the second UE.

9. The apparatus of claim 7, wherein to configure the direct connection with the second UE, the at least one processor is configured to: authenticate and establish a security key.

10. The apparatus of claim 7, wherein to configure the RRC connection, the at least one processor is configured to: configure a signal radio bearer (SRB) or a data radio bearer (DRB) for the connection session.

11. The apparatus of claim 7, wherein the bootstrapping code is unique for the second UE or common for a set of UEs including the second UE.

12. The apparatus of claim 1, wherein to manage the connection, the at least one processor is configured to:
perform one or more of service data adaptation protocol (SDAP) processing or packet data convergence protocol (PDCP) processing for the second UE.

13. The apparatus of claim 1, wherein to manage the connection, the at least one processor is configured to:
support one or more end-to-end user planes for the second UE.

14. The apparatus of claim 1, further comprising a transceiver coupled to the at least one processor, wherein the third device is one of: a third UE, the first UE, or a random access network (RAN).

15. An apparatus for wireless communication at a second user equipment (UE), comprising:
memory; and
at least one processor coupled to the memory and configured to:
establish, with a first UE, a connection session based on a configuration profile, the configuration profile including a mapping of an upper-layer protocol to a lower-layer protocol, one or more security policies, and a routing for one or more services associated with the second UE to a protocol stack, wherein a first radio resource control (RRC) entity at the first UE and a second RRC entity at the second UE are virtual and associated with a same medium access control (MAC) entity and a same physical layer entity; and
configure a connection between the second UE and a third device to be managed by the first UE via the connection session.

16. The apparatus of claim 15, wherein the at least one processor is further configured to configure a configuration management (CM) client to:
receive the configuration profile from the first UE;
transmit, to the first UE, one or more client credentials associated with the second UE; and
receive, from the first UE, one or more owner credentials associated with the first UE.

17. The apparatus of claim 16, wherein to transmit the one or more client credentials, the at least one processor is configured to configure the CM client to transmit the one or more client credentials out-of-band, wherein the one or more client credentials are associated with one or more of: a Quick Response (QR) code comprising a public key or a certificate, a passcode, or a near field communication (NFC).

18. The apparatus of claim 16, wherein to receive the one or more owner credentials, the at least one processor is configured to configure the CM client to receive the one or more owner credentials in-band or out-of-band.

19. The apparatus of claim 16, wherein to receive the one or more owner credentials, the at least one processor is configured to configure the CM client to receive the one or more owner credentials via a device provisioning protocol.

20. The apparatus of claim 15, wherein to establish the connection session, the at least one processor is configured to:
perform a bootstrapping procedure with the first UE.

21. The apparatus of claim 20, wherein to perform the bootstrapping procedure with the first UE, the at least one processor is configured to:
obtain, in-band or out-of-band, a bootstrapping code for discovery of the first UE;
discover, via a sidelink, the first UE based on the bootstrapping code;
configure a direct connection with the first UE;
configure a sidelink RRC connection with the first UE; and
establish the connection session with the first UE via a unicast link over the sidelink.

22. The apparatus of claim 21, wherein to discover the first UE based on the bootstrapping code, the at least one processor is configured to: share one or more credentials with the first UE.

23. The apparatus of claim 21, wherein to configure the direct connection with the first UE, the at least one processor is configured to: authenticate and establish a security key.

24. The apparatus of claim 21, wherein to configure the RRC connection, the at least one processor is configured to:
receive a configuration of a signal radio bearer (SRB) or a data radio bearer (DRB) for the connection session.

25. The apparatus of claim 21, wherein the bootstrapping code is unique for the second UE or common for a set of UEs including the second UE.

26. The apparatus of claim 15, wherein to configure the connection, the at least one processor is configured to:
offload one or more of service data adaptation protocol (SDAP) processing or packet data convergence protocol (PDCP) processing to the third device.

27. The apparatus of claim 15, wherein to manage the connection, the at least one processor is configured to:
host one or more end-to-end user planes.

28. The apparatus of claim 15, further comprising a transceiver coupled to the at least one processor, wherein the third device is one of: a third UE, the first UE, or a random access network (RAN).

29. A method for wireless communication at a first user equipment (UE), comprising:
establishing, with a second UE, a connection session based on a configuration profile, the configuration profile including a mapping of an upper-layer protocol to a lower-layer protocol, one or more security policies, and a routing for one or more services associated with the second UE to a protocol stack, wherein a first radio resource control (RRC) entity at the first UE and a second RRC entity at the second UE are virtual and associated with a same medium access control (MAC) entity and a same physical layer entity; and
managing a connection between the second UE and a third device via the connection session.

30. A method for wireless communication at a second user equipment (UE), comprising:
establishing, with a first UE, a connection session based on a configuration profile, the configuration profile including a mapping of an upper-layer protocol to a lower-layer protocol, one or more security policies, and a routing for one or more services associated with the second UE to a protocol stack, wherein a first radio resource control (RRC) entity at the first UE and a second RRC entity at the second UE are virtual and associated with a same medium access control (MAC) entity and a same physical layer entity; and configuring a connection between the second UE and a third device to be managed by the first UE via the connection session.

\* \* \* \* \*